United States Patent [19]

Motin et al.

[11] 4,229,069
[45] Oct. 21, 1980

[54] DEVICE FOR REMOTE VIEWING OF OBJECTS IN IONIZING RADIATION FIELDS

[76] Inventors: Jury D. Motin, ulitsa Sadovaya, 6, kv. 21, Moskovskaya oblast, Podolsky raion, Scherbinka; Igor A. Reformatsky, ulitsa Druzhby 2/19, kv. 85, ow; Pavel R. Sinitsyn, Naberezhnaya Chernoi rechki, 6, kv. 13, Leningrad; Nikolai M. Ivanov, prospeckt Lunacharskogo, 62, korpus 1, kv. 134, Leningrad; Igor K. Malakhov, ulitsa Frunze, 16, kv. 371, Leningrad; Boris I. Ivanov, Komsomolsky prospeckt, 41, kv. 154, Moscow, all of U.S.S.R.

[21] Appl. No.: 965,038

[22] Filed: Nov. 30, 1978

[51] Int. Cl.² .................................................. G02B 5/14
[52] U.S. Cl. ............................ 350/96.29; 350/96.30; 350/96.34; 176/19 R
[58] Field of Search ............... 350/96.29, 96.30, 96.34, 350/96.10, 96.24, 96.26, 61; 356/241; 176/19 R

[56] References Cited
U.S. PATENT DOCUMENTS 3,265,584  8/1966  Cooper ............................ 176/19 R
3,737,372  6/1973  Debergh et al. .................. 176/19 R
4,036,686  7/1977  Weilbacher et al. ........... 350/96.10 X

OTHER PUBLICATIONS

J. Shah "Effects of Environmental Nuclear Radiation on Optical Fibers"Bell Sys. Tech. Journal, vol. 54, No. 7, Sep. 1975, pp. 1207–1213.
E. J. Friebele et al. "Radiation Protection of Fiber Optic materials:. . ." Applied Physics Letters, vol. 24, No. 9, May 1974, pp. 412–413.

*Primary Examiner*—Rolf G. Hille
*Attorney, Agent, or Firm*—Fleit & Jacobson

[57] ABSTRACT

A device for remote viewing of objects in ionizing radiation fields, wherein a fibre-optics channel for transmitting the image of an object under observation beyond the biological shield against ionizing radiation comprises an entrance lens in whose immediate vicinity there is placed one of the ends of a bundle of optic fibres, the other end of the bundle being beyond the biological shield. The fibre-optics channel also comprises a source of heat to maintain at least only the fibre bundle at a temperature ensuring thermostabilization of its light conducting properties in the presence of the ionizing radiation.

8 Claims, 7 Drawing Figures

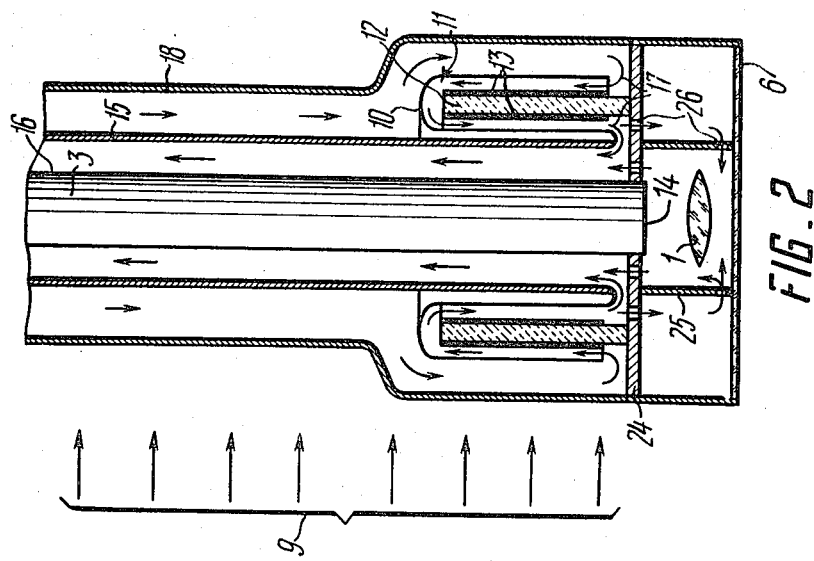
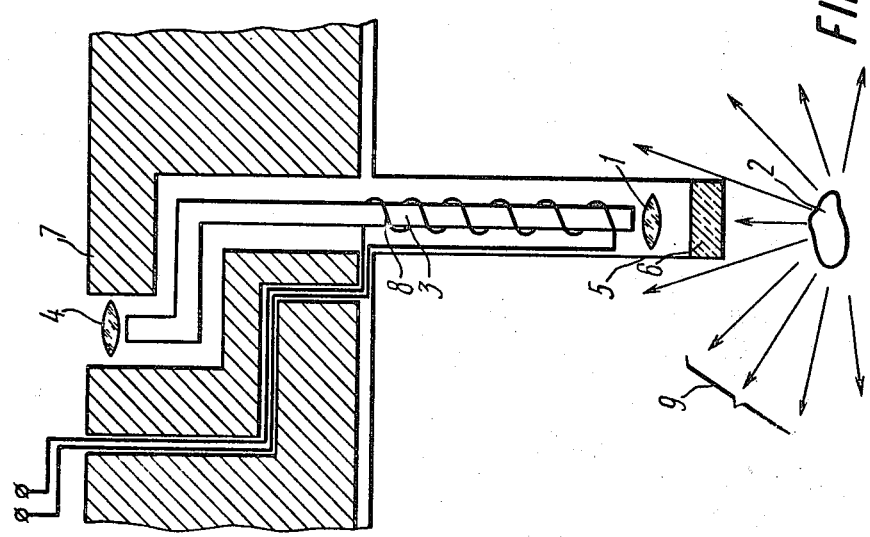

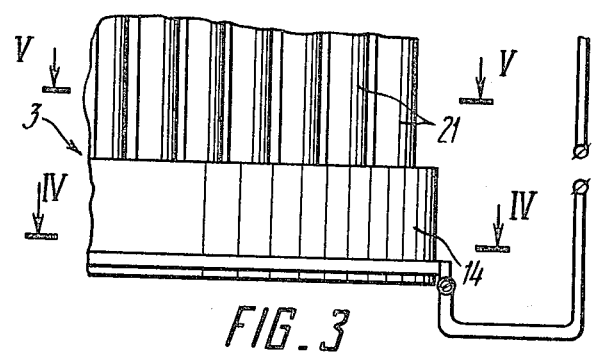
FIG.3
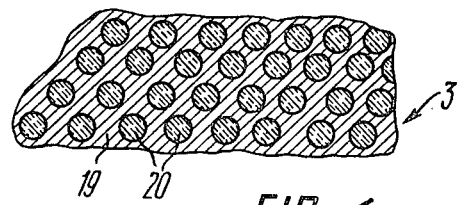
FIG.4
FIG.5
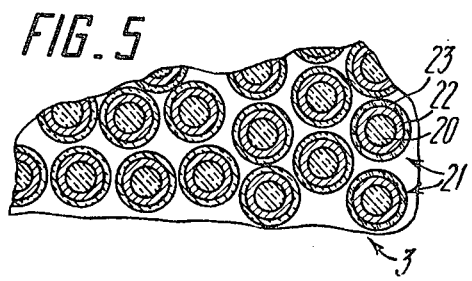

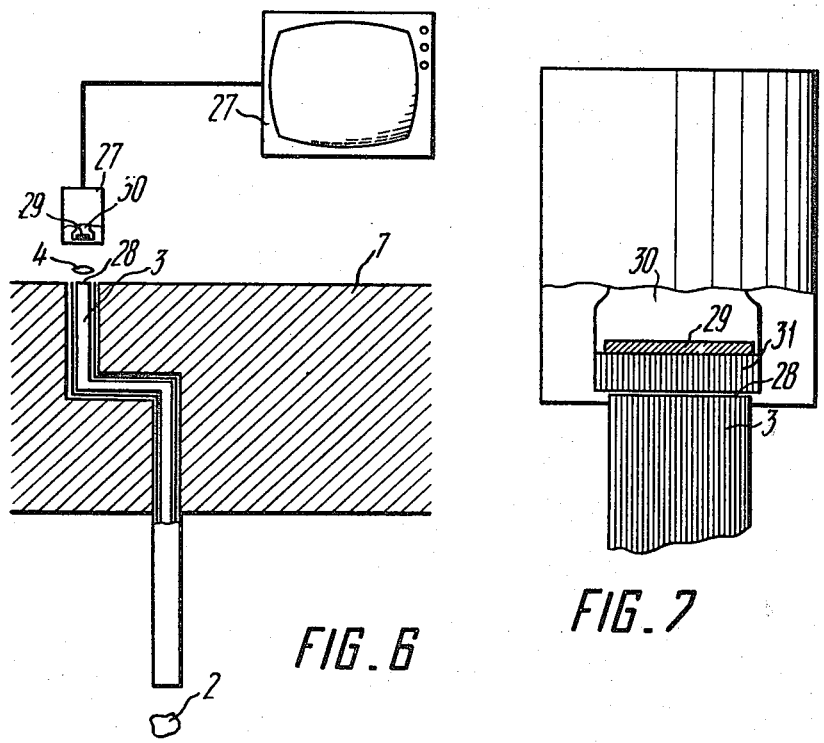

DEVICE FOR REMOTE VIEWING OF OBJECTS IN IONIZING RADIATION FIELDS

FIELD OF THE INVENTION

The present invention relates to instrumentation used at nuclear power plants, and more particularly to a device for remote viewing of objects in ionizing radiation fields.

BACKGROUND OF THE INVENTION

In routine operation of nuclear power plants, as well as research in the fields of radiation chemistry and reactor materialogy, remote viewing of objects placed in strong ionizing radiation fields furnishes valuable information to the personnel. Currently existing remote viewing systems permit not only direct observation of the processes occurring in radiation fields, but also their photography and cinematography. According to their design features, the remote viewing systems can be classified into the following three main categories: optical systems, such as viewing ports in protection cells, periscopes, and systems with a fibre-optics image translator; electron-optical systems, such as TV cameras, and electron-optical converters; and composite systems in which a periscope or a bundle of optic fibres is combined with a TV camera.

Despite the great variety of designs, the existing remote viewing systems function for extended periods only at an average ionizing radiation dose rate $P \lesssim 100$ R/sec. This restriction is imposed by the limited radiation-optical stability of the optical elements used in a remote viewing system. The problem of enhancing the radiation-optical stability of optical elements is partially solved by introducing into their material stabilizing additives, for example, $CeO_2$ added to inorganic glass. Optical elements made of glasses containing stabilizing additives may be employed up to an integral absorbed dose of about $10^8$ rads (at a dose rate of about 100 R/sec, the integral absorbed dose of about $10^8$ rads can be accumulated during six months). It should be noted that materials with $CeO_2$ additives feature pronounced radioluminescence in a strong ionizing radiation field, the intensity of this radioluminescence increasing with that of the field. Therefore, a fibre probe for inspecting nuclear reactor cores, whose design is described by N. S. Capani in his book "Fibre Optics" (Moscow, "Mir" Publishers, 1969, p. 360), does not permit viewing of the core of an operating reactor, but is used for examining the surfaces of core components, checking the quality of assembly, and so on, only during the period prior to operation.

An example of a combined remote viewing system is the device for investigating fuel elements of a nuclear reactor, disclosed in French Patent Application No. 2,298,859 published in "Bulletin officiel de la propriété industrielle", No. 39; Cl. G 21C 17/06. This device comprises a prism endoscope with a tilted mirror, interfaced with a TV camera.

The device under consideration can be employed in the core of a nuclear reactor when the gamma and high-energy beta radiation dose rates do not exceed $\sim 100$ R/sec.

Also known is a device for remote viewing of objects in ionizing radiation fields, whose fibre-optics channel intended for transmission of the object's image beyond the biological shield against ionizing radiation comprises an entrance lens and a bundle of individual optic fibres, one end of the bundle being in direct proximity to the entrance lens, while the other end is beyond the biological shield (cf. N. S. Capani, "Fibre Optics", "Mir" Publishers, Moscow, 1969, p. 360).

This device, just like those described above, operates only in weak ionizing radiation fields, has a short service life and is practically useless in strong ionizing radiation fields.

SUMMARY OF THE INVENTION

It is an object of the present invention to provide a device for remote viewing of objects in strong ionizing radiation fields.

Another object of the invention is to extend the service life of the device for remote viewing of objects in ionizing radiation fields.

The invention essentially resides in that, in a device for remote viewing of objects in ionizing radiation fields, whose fibre-optics channel intended for transmission of the image of an object under observation beyond a biological shield against ionizing radiation comprises an entrance lens and a bundle of individual optic fibres, one end of the bundle being placed in the immediate vicinity of the entrance lens, while the other end is beyond the biological shield, according to the invention, the fibre-optics channel also comprises a source of heat to maintain at least only the fibre bundle at a temperature ensuring thermostabilization of its light conducting properties in the presence of the ionizing radiation.

The heat source should preferably be made as a coil connected to a current source and surrounding the fibre bundle over its portion lying in the ionizing radiation field.

It is expedient that the heat source comprise a heat exchanger with an electric heating element, both being arranged in the immediate vicinity of one of the ends of the fibre bundle, and a pipe whose inner space communicates with the heat exchanger, on the heating side, and accommodates the fibre bundle which is heated by a gas or a mixture of gases stable to ionizing radiation.

It is desirable that the heat source be essentially a coating of a material having a resistivity of 0.1 ohm/cm, and higher, said coating being applied on the surface of each fibre of the bundle and associated with the current source.

It is preferable that the heat source be essentially a component of the material of the fibre bundle, which may be a chemical compound of elements ensuring transformation of the energy of absorbed and scattered neutrons to thermal energy.

Preferably, the component should belong to the composition of the material of the fibres of the bundle.

It is also preferable that the surface of each fibre in the bundle have a coating of a material including said component.

BRIEF DESCRIPTION OF THE DRAWINGS

The invention will now be described in greater detail with reference to specific embodiments thereof, taken in conjunction with the accompanying drawings, wherein:

FIG. 1 is a partially cut longitudinal section schematic viewing of the proposed device for remote viewing of objects in ionizing radiation fields, according to the invention;

FIG. 2 is a partially cut longitudinal section view of a portion of the fibre-optics channel of the proposed device, with a heat source made as a heat exchanger with a heating element, according to the invention;

FIG. 3 shows a portion of the fibre bundle of the proposed device, near the entrance end of the bundle, with a current source in the form of terminals, according to the invention;

FIG. 4 is a section view taken along line IV—IV of FIG. 3;

FIG. 5 is a section view taken along line V—V of FIG. 3;

FIG. 6 is a schematic of the proposed device with a TV channel, according to the invention;

FIG. 7 shows the interface between the exit end of the fibre bundle of the proposed device and a camera CRT, with the photocathode being shown in cross section through the partially cut housing, according to the invention.

DETAILED DESCRIPTION OF THE INVENTION

The proposed device for remote viewing of objects in ionizing radiation fields comprises a fibre-optics channel intended for transmission of the image of an object under observation, placed in a strong ionizing radiation field, beyond the biological shield against the ionizing radiation. Referring now to FIG. 1, the fibre-optics channel comprises an entrance lens 1 projecting the image of an object 2 under observation on the entrance end of an optic fiber bundle 3 with regularly arranged fibres, placed in the immediate vicinity of the entrance lens 1. Through the entrance end of the bundle 3, the image of the object 2 is transmitted to its exit end. In this embodiment, the device includes an exit lens 4.

The fibre-optics channel is housed in an airtight case 5 made as a rigid pipe (or a flexible metal hose) and provided, at the end facing the object 2, with an entrance window 6 made of a transparent material. The other end of the case 5 is welded to the inner lining of a wall 7 serving as the biological shield.

The fibre-optics channel also comprises a source of heat intended to maintain at least only the fibre bundle 3 at a temperature ensuring thermostabilization of its light conducting properties in the presence of the ionizing radiation. In this embodiment, the heat source is made as a coil 8 surrounding the fibre bundle 3 over its portion lying in the field of the ionizing radiation 9 and connected to a current source shown as terminals.

FIG. 2 is a schematic of a device with a fibre-optics channel similar to that of FIG. 1 and a heat source of an entirely different design. As can be seen from FIG. 2, the heat source includes a heat exchanger 10 with a heating element 11 made as a ceramic cylinder 12, on the inner and outer surfaces whereof a coating 13 is applied, said coating being of a metal featuring high resistivity, in this embodiment, tantalum. The heat exchanger 10 with the heating element 11 are arranged in direct proximity to an end 14 of the fibre bundle 3.

The heat source also includes a pipe 15 whose inner space 16 communicates with the heating side of the heat exchanger 10. The inner space 16 accommodates the fibre bundle 3 which is heated by a gas (or a mixture of gases) stable to the ionizing radiation 9 and chemically inert with respect to the material of the heat exchanger 10, in this embodiment, said gas is argon.

Cold gas is fed to the heat exchanger 10 via a pipe 18 envelopping the pipe 15 whose inner space 16 accommodates the fibre bundle 3. After having been heated in the heat exchanger, the gas flows into the pipe 15 and around the fibre bundle 3, heating it to the required temperature. At the exit from the fibre-optics channel, the spent gas returns to the pipe 18 and is fed again to the heat exchanger 10.

FIG. 3 shows the end portion of the fibre bundle 3 and a heat source accomplished as a coating of a material having a resistivity of 0.1 ohm/cm and higher. The coating is applied on the surface of each one of the fibres making up the bundle 3 and associated with a current source shown as terminals.

In this embodiment, the end 14 of the fibre bundle 3 is, as can be seen from FIG. 4, a matrix of an electrically conductive material 19 in which light-conducting fibres 20 are regularly arranged, said matrix also serving as one of the current leads. In any other cross section of the fibre bundle 3, as is shown in FIG. 5, light-transmitting fibres 21 making up the bundle 3 are not associated with one another. The light-conducting fibres 21 contain a coating 22 applied on the surface of each fibre 20. The coating 22 is of an electrically conductive material and serves both as a light-screening layer for each fibre 20 and as a source of heat for the same fibre 20. Applied on top of the electrically conductive coating 22 is an insulating coating 23 precluding galvanic contact between the electrically conducting coatings 22 of the fibres 21 over the entire length of the fibre bundle 3.

Along with the above-described heat sources which, through different in design, have one thing in common, namely, they are external relative to the fibre bundle and the material of which it is made, there is proposed an internal source of heat, whose action is based on the effect of the energy of absorbed or scattered neutrons being transformed to thermal energy released over the entire volume of the material of the fibre bundle. To achieve this effect, one should introduce into the composition of the fibre bundle material a component which may be a chemical compound of elements ensuring transformation of the energy of absorbed or scattered neutrons to thermal energy. An example of such a reaction is reaction (n,α) occurring on the nuclei of boron isotope ($_5B^{10}$) in a thermal-neutron flux:

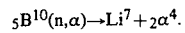

$$_5B^{10}(n,\alpha) \rightarrow Li^7 + _2\alpha^4.$$

Used as the material of the fibres 20 (FIG. 5) of the bundle 3 may be optical borosilicate glass of the following composition, % by weight:

$SiO_2$: 8.6
$Al_2O_3$: 2.0
$CaO$: 9.0
$MgO$: 4.8
$Li_2O$: 5.4
$B_2O_3$: 80.1

Alternatively, the material of the fibres 20 may be cadmium-borate glass of the following composition, % by weight:

$CdO$: 50
$B_2O_3$: 45
$BeCO_3$: 5.

Thus, making the fibres 20 of glass of one of the above compositions is sufficient to achieve, in the thermal-neutron flux, the desired effect of heat being released throughout the entire volume of each fibre 20 in the bundle 3, especially that cadmium and its compounds (in our example—CdO) and also capable of transforming the energy of the scattered or absorbed neutrons to thermal energy. In order to enhance the effect of heating the material of which the fibres 20 are made, each fibre 20 may receive a coating 22 of a material containing chemical compounds of elements capable of the above energy transformation. This material may be glass containing oxides of cadmium, boron and gadolinium in the following ratio, % by weight:

CdO: 34
$B_2O_3$: 33
$GdO_2$: 33.

The energy of neutrons can also be effectively transformed to thermal energy in materials with lithium compounds, for example, glass of the following composition, % by weight:

$Li_2O$: 30
$SiO_2$: 70.

As has been mentioned above, the heat source may also serve to heat such structural components of the fibre-optics channel as the entrance lens 1 (FIG. 2) and entrance window 6. To this end, made in partitions 24 and 25 are holes 26 through which the heated gas (or gas mixture) is fed to the entrance lens 1 and entrance window 6 and heats them to a certain temperature.

A device for remote viewing of objects in ionizing radiation fields of any design and including a fibre-optics channel and a heat source may also comprise, for its functional capacities and area of application to be extended, a TV channel 27 (FIG. 6), in which case the image of the object 2 under observation may be projected from an exit end 28 of the fibre bundle on a photocathode 29 of a camera CRT 30 via the exit lens 4.

FIG. 7 shows the interface between the exit end 28 of the fibre bundle 3 and the camera CRT 30, without any exit lens. The use of the camera CRT 30 with a fibre-optics unit 31 performing the function of its entrance window permits the image from the exit end 28 of the fibre bundle 3 to be projected on the photocathode 29 of the camera CRT 30 without using an exit lens, owing to the surface of the exit end 28 of the fibre bundle 3 mating with that of the fibre-optics unit 31 performing the function of the entrance window of the camera CRT 30.

The device for remote viewing of objects in ionizing radiation fields may be used for periodical or continuous observation. The basic difference in the design is, in this case, the intermittent or continuous mode of operation, respectively, of the heat source which may be embodied as shown in any one of FIGS. 1, 2 and 3.

For example, in the intermittent mode of operation of the device shown in FIG. 1 with the heat source being made in the form of the coil 8 surrounding the portion of the fibre bundle 3, lying in the field of the ionizing radiation 9, the operator connects the coil 8 to the current source prior to starting observation of the object 2. Therewith, the surrounded portion of the fibre bundle 3 is heated to a temperature required to maintain the process of thermostimulated destruction of the colour centres appearing throughout the material of the fibres of the bundle 3 under, the effect of the ionizing radiation 9. The heating of the fibre material leads to a shift of the dynamic equilibrium between the competitive processes of radiation-induced generation and thermostimulated destruction of the colour centres towards the preferable thermostimulated destruction with the result that the light conducting properties of the fibre bundle 3 are enhanced to the level of the non-irradiated state, and a cycle of observation of the object 2 can be completed. After the observation cycle is over, the operator disconnects the coil 8 from the current source. When the device of FIG. 1 is operated in the continuous mode, the temperature of the material of the fibres of the bundle 3 is maintained, during the entire period of operation, at a required level by means of the coil 8 connected to the current source. If necessary, the power supply to the coil 8, hence, the temperature of the fibre material can be adjusted by the operator, manually or automatically.

The functional diagram of a device comprising a heat source made, according to FIG. 5, as an electrically conductive coating 22 applied on the surface of each one of the fibres 20 of the bundle 3 is identical with that of the device of FIG. 1.

In the intermittent mode of operation of a device including a heat source as shown in FIG. 2, the operator blows, prior to observation of the object 2 (FIG. 1), the heating element 11 (FIG. 2) of the heat exchanger 10 with a stationary flow of a gas (or a mixture of gases) stable to ionizing radiation, then connects the heating element 11 to the power supply (not shown). The gas is heated in the heat exchanger 10, flows into the pipe 15 accommodating the fibre bundle 3, and heats the material of the fibres of the bundle 3 to a required temperature. As a result of heating, the light conducting properties of the fibre bundle 3 are enhanced to the level of the non-irradiated state, and the operator can complete the cycle of observation of the object 2 (FIG. 1). The observation cycle being over, the operator disconnects the heating element 11 from the power supply, then shuts off the gas flow into the heat exchanger 10. In the continuous mode, the heating element 11 of the heat exchanger 10 is blown, over the entire period of operation, with a stationary gas flow, the basic parameters of the gas flow as well as the power supply to the heating element 11 of the heat exchanger 10 being automatically adjustable.

A device in which the heat source is essentially a component of the composition of the fibre bundle material, which may be a chemical compound of elements ensuring transformation of the energy of absorbed or scattered neutrons to thermal energy, is intended for operation in the mode of continuous observation.

In the case of optical borosilicate glass whose composition has been given above, the element providing for effective transformation of the energy of absorbed or scattered neutrons to thermal energy is boron present in the form of compound $B_2O_3$. Owing to the large cross-section of interaction of the boron isotope ($B^{10}$) with thermal neutrons and to the relatively high (18.5%) content thereof in the natural mixture of isotopes, in the borosilicate glass placed in a strong ($\gtrsim 10^{13}$) thermal-neutron flux, nuclear reaction $B^{10}(n,\alpha)$ effectively takes place, as a result of which, each time a neutron is captured by the nucleus of $B^{10}$, a $Li^7$ nucleaus is formed along with an alpha particle $\alpha^4$ with a mean energy of about 7 meV which is completely transformed to thermal energy as the alpha particle quickly decelerates. Thus, the temperature of the glass, hence, of the entire fibre bundle 3, may be maintained, during the entire operation period, at a level ensuring thermostabilization of the light conducting properties of the fibre bundle 3.

When lithium-containing glass is used as the material of the fibres 20 (FIG. 5), there occurs an (n,n) reaction, or a reaction of elastic scattering of neutrons, on the nuclei of lithium ($Li^6$). As a result of the nuclear reaction, elastic scattering of neutrons takes place with simultaneous shift of the $Li^6$ nuclei in the lattice of the glass, during which shift the $Li^6$ nuclei rapidly lose energy which is completely transformed to thermal energy.

When boron- and beryllium-containing glasses are used as the material of the fibres 20, the neutron flux energy is transformed to thermal energy as a result of an (n,α) reaction with emission of a charged particle and an (n,n) reaction of elastic scattering.

The device for remote viewing of objects in ionizing radiation fields can be employed for scientific research and monitoring of processes occurring in strong ionizing radiation fields, for example, in the core of an operating nuclear power plant or in a protection cell when great quantities of radioactive substances are handled.

As has been mentioned above, the proposed device is based on the principle of thermostabilization of the main characteristic of the optical material, namely, its light conducting properties in strong fields of ionizing radiation. The principle of thermostabilization is, in turn, based on the effect of thermal annealing of radiation defects, including colour centres appearing in optical materials under the effect of ionizing radiation. The applicability of this principle to any optical materials has been experimentally and theoretically corroborated. The principal structural component of the proposed device is the bundle of regularly arranged fibres, which permits the image of an object under observation, placed in a strong ionizing radiation field, to be transmitted beyond the biological shield. Thus, one of the basic characteristics of the image of the object under observation, namely, its resolution, will be determined by the same characteristic of the fibre bundle. At present, it is possible to produce a fibre bundle of a required length with a resolution of about 80 lines per millimeter. Such a resolution corresponds to that of a TV image with a scanning standard of 625 lines per frame. The principle of thermostabilization permits visualizing objects placed in a gamma-radiation field with an intensity of several ten thousand R/sec at neutron fluxes of $10^{13}$ to $10^{14}$ n.cm$^{-2}$.sec$^{-1}$. The fibre-optics channel, including the entrance lens, fibre bundle and exit lens, can be interfaced with a TV channel. In this case, it becomes possible to obtain a video recording instead of cinematography, and the observer may be tens of kilometers away from the object. Depending on the requirements, use may be made of a colour or stereo-scopic TV channel.

What is claimed is:

1. A device for remote viewing of objects in ionizing radiation fields, comprising:
   a fibre-optics channel intended for transmission of the image of an object under observation beyond a biological shield against ionizing radiation;
   an entrance lens of said fibre-optics channel;
   a fibre bundle of said fibre-optics channel, one end whereof is placed in the immediate vicinity of said entrance lens, while the other end is beyond said biological shield against ionizing radiation;
   a source of heat in said fibre-optics channel, intended to maintain at least only said fibre bundle at a temperature ensuring thremostabilization of its light conducting properties in the presence of the ionizing radiation.

2. A device as claimed in claim 1, comprising:
   a portion of said fibre bundle, lying in the ionizing radiation field;
   a metal coil surrounding said fibre bundle over said portion; p1 a current source connected to said coil and located outside said fibre-optics channel;
   said coil serving as said heat source.

3. A device as claimed in claim 1, comprising:
   a heat exchanger located in said fibre-optics channel in direct proximity to one of said ends of said fibre bundle;
   a heating element of said heat exchanger;
   a pipe located in said fibre-optics channel and communicating with said heat exchanger, on the heating side;
   said fibre bundle being accommodated in said pipe and heated by a gas or a mixture of gases stable to ionizing radiation;
   said heat exchanger with said heating element and said pipe serving as said heat source.

4. A device as claimed in claim 1, comprising:
   fibres of said fibre bundle;
   a current source located outside said fibre-optics channel;
   a coating of a material having a resistivity of 0.1 ohm/cm and higher, applied on the surface of each of said fibres of said fibre bundle and connected to said current source;
   said coating serving as said heat source.

5. A device for remote viewing of objects in ionizing radiation fields, comprising:
   a fibre-optics channel intended for transmission of the image of an object under observation beyond a biological shield against ionizing radiation;
   an entrance lens of said fibre-optics channel;
   a fibre bundle of said fibre-optics channel, one end whereof is placed in the immediate vicinity of said entrance lens, while the other end is beyond said biological shield against ionizing radiation;
   fibres of said fibre bundle;
   a source of heat in said fibre-optics channel, intended to maintain at least only said fibre bundle at a temperature ensuring thermostabilization of its light conducting properties in the presence of the ionizing radiation;
   a component of the composition of the material of said fibre bundle, which is a chemical compound of elements ensuring transformation of the energy of absorbed or scattered neutrons to thermal energy;
   said component serving as said heat source.

6. A device as claimed in claim 5, comprising:
   said component forming part of the composition of the material of said fibres of said fibre bundle.

7. A device as claimed in claim 5, comprising:
   a coating of a material including said component, applied on the surface of each of said fibres of said fibre bundle.

8. A device as claimed in claim 6, comprising:
   a coating of a material including said component, applied on the surface of each of said fibres of said fibre bundle.

* * * * *